United States Patent
Sane et al.

(10) Patent No.: US 10,319,244 B2
(45) Date of Patent: Jun. 11, 2019

(54) COORDINATED PLANNING WITH GRAPH SHARING OVER NETWORKS

(71) Applicant: SIKORSKY AIRCRAFT CORPORATION, Stratford, CT (US)

(72) Inventors: Harshad S. Sane, Southbury, CT (US); George Nicholas Loussides, Branford, CT (US); Igor Cherepinsky, Sandy Hook, CT (US); Brendan J. Englot, New York, NY (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/502,446

(22) PCT Filed: Sep. 14, 2015

(86) PCT No.: PCT/US2015/049957
§ 371 (c)(1),
(2) Date: Feb. 7, 2017

(87) PCT Pub. No.: WO2016/048698
PCT Pub. Date: Mar. 31, 2016

(65) Prior Publication Data
US 2017/0263130 A1    Sep. 14, 2017

Related U.S. Application Data

(60) Provisional application No. 62/053,357, filed on Sep. 22, 2014.

(51) Int. Cl.
*G08G 5/00*    (2006.01)
*G08G 5/04*    (2006.01)
(Continued)

(52) U.S. Cl.
CPC ............. *G08G 5/006* (2013.01); *B64C 27/06* (2013.01); *B64C 27/82* (2013.01);
(Continued)

(58) Field of Classification Search
CPC .............................. G08G 5/006; G01C 21/34
See application file for complete search history.

(56) References Cited

U.S. PATENT DOCUMENTS 6,285,320 B1    9/2001 Olster et al.
6,941,191 B2*   9/2005 Jaeger .................. G05D 1/0295
                                                    318/568.11
(Continued)

FOREIGN PATENT DOCUMENTS

WO    2012141601 A2    4/2011

OTHER PUBLICATIONS

International Search Report and Written Opinion; International Application No. PCT/US2015/049957; International filing Date; Sep. 14, 2016; Oct. 30, 2015; dated Dec. 4, 2015; 16 Pages.
(Continued)

*Primary Examiner* — Adam D Tissot
*Assistant Examiner* — Alex C Dunn
(74) *Attorney, Agent, or Firm* — Cantor Colburn LLP

(57) ABSTRACT

A method for path planning for a plurality of vehicles in a mission space includes determining, with a processor, information indicative of a first local graph of a first vehicle; receiving, with the processor over a communication link, information indicative of a second local graph from a second vehicle; assembling, with the processor, information indicative of a global graph in response to the receiving of the second local graph; wherein the global graph includes information assembled from the first local graph and the second local graph; and wherein the global graph indicates
(Continued)

connectivity of objectives for each vehicle of the plurality of vehicles in the mission space.

15 Claims, 3 Drawing Sheets

(51) Int. Cl.
| | | |
|---|---|---|
| *B64C 27/06* | (2006.01) | |
| *B64C 27/82* | (2006.01) | |
| *B64C 29/00* | (2006.01) | |
| *B64C 39/02* | (2006.01) | |
| *B64D 45/08* | (2006.01) | |
| *B64D 47/08* | (2006.01) | |

(52) U.S. Cl.
CPC ........ *B64C 29/0025* (2013.01); *B64C 39/024* (2013.01); *B64D 45/08* (2013.01); *B64D 47/08* (2013.01); *G08G 5/0008* (2013.01); *G08G 5/0013* (2013.01); *G08G 5/0021* (2013.01); *G08G 5/0034* (2013.01); *G08G 5/0039* (2013.01); *G08G 5/0078* (2013.01); *G08G 5/0086* (2013.01); *G08G 5/045* (2013.01); *B64C 2201/024* (2013.01); *B64C 2201/145* (2013.01)

(56) References Cited

U.S. PATENT DOCUMENTS

| | | | | |
|---|---|---|---|---|
| 7,409,378 | B2 * | 8/2008 | Castellani | G06Q 50/188 |
| | | | | 706/62 |
| 7,447,593 | B2 * | 11/2008 | Estkowski | G01C 21/20 |
| | | | | 700/250 |
| 7,539,557 | B2 * | 5/2009 | Yamauchi | G05D 1/0038 |
| | | | | 340/12.54 |
| 7,599,305 | B2 * | 10/2009 | Bui | H04L 29/06 |
| | | | | 370/252 |
| 7,603,212 | B2 * | 10/2009 | Ariyur | G05D 1/0289 |
| | | | | 180/167 |
| 8,442,765 | B1 | 5/2013 | Ingvalson | |
| 8,543,261 | B2 * | 9/2013 | Anderson | B60W 30/09 |
| | | | | 701/3 |
| 8,594,917 | B2 * | 11/2013 | Sawhill | G08G 5/0013 |
| | | | | 701/122 |
| 8,712,096 | B2 | 4/2014 | Xiao et al. | |
| 9,858,825 | B2 * | 1/2018 | Vilaplana | G06Q 10/047 |
| 2004/0030571 | A1 | 2/2004 | Solomon | |
| 2005/0075785 | A1 * | 4/2005 | Gray | A01B 69/008 |
| | | | | 701/410 |
| 2005/0090201 | A1 | 4/2005 | Lengies et al. | |
| 2006/0242606 | A1 | 10/2006 | Lin | |
| 2007/0005237 | A1 * | 1/2007 | Needham | G01C 21/3469 |
| | | | | 701/414 |
| 2010/0211302 | A1 | 8/2010 | Ribbe et al. | |
| 2012/0070034 | A1 * | 3/2012 | Xiao | G06K 9/00624 |
| | | | | 382/103 |
| 2012/0123614 | A1 * | 5/2012 | Laws | G05B 19/4189 |
| | | | | 701/2 |
| 2012/0215435 | A1 * | 8/2012 | Subbu | G08G 5/0013 |
| | | | | 701/120 |
| 2013/0085981 | A1 | 4/2013 | Fuciarelli et al. | |
| 2013/0176192 | A1 | 7/2013 | Varga et al. | |
| 2013/0184864 | A1 | 7/2013 | Guo et al. | |
| 2013/0204524 | A1 * | 8/2013 | Fryer | G01C 21/3407 |
| | | | | 701/527 |
| 2013/0325306 | A1 * | 12/2013 | Caveney | B60W 30/0953 |
| | | | | 701/117 |
| 2014/0297094 | A1 * | 10/2014 | Dolgov | B60W 30/095 |
| | | | | 701/28 |
| 2015/0254988 | A1 * | 9/2015 | Wang | G05D 1/0214 |
| | | | | 701/3 |
| 2016/0275801 | A1 * | 9/2016 | Kopardekar | G08G 5/0043 |

OTHER PUBLICATIONS

EP Communication; Extended European Search Report; Application No. 15845166.6-1203/3198580 PCT/US2015/049957; dated Apr. 20, 2018; pp. 1-10.

International Preliminary Report on Patentability for International Appln. No. PCT/US2015/049957; International Filing Date: Sep. 14, 2015; dated Mar. 28, 2017; 6 pages.

G. Sanchez, et al., "On Delaying Collision Checking in PRM Planning—Application to Multi-Robot Coordination", by G. Sanchez and J.C. Latombe. Int. J. of Robotics Research, 21(1):Jan. 5-26, 2002, pp. 1-28.

G. Sanchez, et al., "Using a PRM Planner to Compare Centralized and Decoupled Planning for Multi-Robot Systems," G. Sanchez and J.C. Latombe. Proc. IEEE Int. Conf. on Robotics and Automation, 2002, pp. 1-8.

Svestka et al.; Coordinated Motion Planning for Multiple Car-Like Robots Using Probabilistic Roadmaps; IEEE International Conference on Robotics and Automation; vol. 2, Jun. 1995; pp. 1631-1636.

\* cited by examiner

COORDINATED PLANNING WITH GRAPH SHARING OVER NETWORKS

CROSS REFERENCE TO RELATED APPLICATIONS

This application is a National Stage application of PCT/US2015/049957, filed Sep. 14, 2015, which claims the benefit of U.S. Provisional Application No. 62/053,357, filed Sep. 22, 2014, both of which are incorporated by reference in their entirety herein.

BACKGROUND

The subject matter disclosed herein relates generally to the field of vehicle management systems and to a method and system for coordinated mission planning and graph sharing between independent agents over a communication network.

DESCRIPTION OF RELATED ART

Multiple homogeneous (similar vehicles) or heterogeneous (different types of vehicles) independent agents may coordinate to effectively navigate a new environment or accomplish a common task in support of mission goals. These independent agents may cooperate through information sharing over a common network through a "common operating picture." However, coordinated planning applications in unmanned autonomous vehicles ("UAV's") present new challenges. For example, the nature of the environment can cause UAV's to become impeded by unknown obstacles or situations as they go about the execution of tasks and mission plans may be compromised on account of these obstacles. A coordinated planning method between autonomous and semi-autonomous independent agents is desired.

BRIEF SUMMARY

According to an aspect of the invention, a method for path planning for a plurality of vehicles in a mission space includes determining, with a processor, information indicative of a first local graph of a first vehicle; receiving, with the processor over a communication link, information indicative of a second local graph from a second vehicle; assembling, with the processor, information indicative of a global graph in response to the receiving of the second local graph; wherein the global graph includes information assembled from the first local graph and the second local graph; and wherein the global graph indicates connectivity of objectives for each vehicle of the plurality of vehicles in the mission space.

In addition to one or more of the features described above, or as an alternative, further embodiments could include determining of the information of the first local graph comprises receiving sensor information indicative of obstacles and constraints in the mission space.

In addition to one or more of the features described above, or as an alternative, further embodiments could include comprising determining nodes and edges for each of the first and second local graph.

In addition to one or more of the features described above, or as an alternative, further embodiments could include receiving the first local graph by the second vehicle and assembling the global graph in the second vehicle in response to the receiving of the first local graph.

In addition to one or more of the features described above, or as an alternative, further embodiments could include receiving the first and second local graphs through direct communication links between the first and second vehicle over a communication network.

In addition to one or more of the features described above, or as an alternative, further embodiments could include receiving the first and second local graphs through an indirect communication link connected to a communication beacon over a communication network.

In addition to one or more of the features described above, or as an alternative, further embodiments could include re-planning the global graph as re-planned first and second local graphs are received by the first and second vehicles.

In addition to one or more of the features described above, or as an alternative, further embodiments could include establishing direct communication links between the first vehicle and other vehicles as objectives in the global graph are accomplished.

According to another aspect of the invention, a system for path planning for a plurality of vehicles in a mission space includes a communication network; a processor; and memory having instructions stored thereon that, when executed by the processor, cause the system to: determine information indicative of a first local graph of a first vehicle; receive information indicative of a second local graph from a second vehicle; assemble information indicative of a global graph for the mission space in response to the receiving of the second local graph; wherein the global graph includes information from the first local graph and the second local graph; and wherein the global graph indicates connectivity of objectives for each vehicle of the plurality of vehicles in the mission space.

In addition to one or more of the features described above, or as an alternative, further embodiments could include the processor configured to receive sensor information indicative of obstacles and constraints in the mission space.

In addition to one or more of the features described above, or as an alternative, further embodiments could include the processor configured to determine nodes and edges for each of the first and second local graph.

In addition to one or more of the features described above, or as an alternative, further embodiments could include the processor configured to receive the first local graph by the second vehicle and assemble the global graph in the second vehicle in response to the receiving of the first local graph.

In addition to one or more of the features described above, or as an alternative, further embodiments could include the processor configured to receive the first and second local graphs through direct communication links between the first and second vehicle over the communication network.

In addition to one or more of the features described above, or as an alternative, further embodiments could include the processor configured to receive the first and second local graphs through an indirect communication link connected to a communication beacon over the communication network.

In addition to one or more of the features described above, or as an alternative, further embodiments could include the processor configured to re-planning the global graph as re-planned first and second local graphs are received by the first and second vehicles.

Technical functions of the combination of features include providing for mission success and improved mission feasibility through collaboration of plans between agents with a path planning method.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Figure 1:
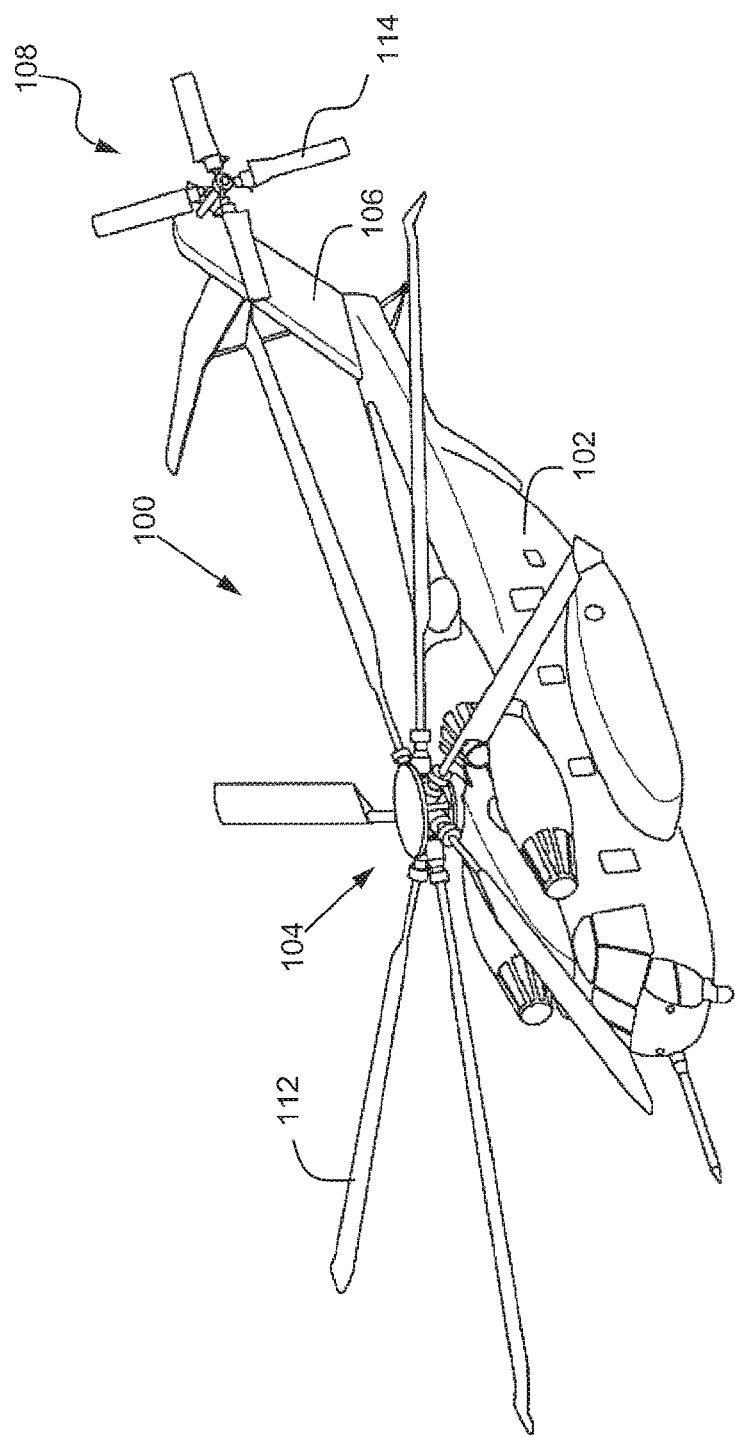
FIG. 1 is a schematic view of an example independent agent according to an embodiment of the invention.

Referring now to the drawings, FIG. 1 illustrates a general perspective view of an exemplary independent agent or vehicle equipped for operation in accordance with embodiments of the invention. The exemplary independent agent (hereinafter "agent") is in the form of a vertical takeoff and landing (VTOL) autonomous or semi-autonomous rotary-wing aircraft or helicopter 100 that implements a motion planning algorithm 204 for implementing a sampling-based planning method for coordinated mission planning between a plural or multiple number of independent agents that are substantially similar to independent agent 100. The sampling based-planning method is described below with reference to FIGS. 3-4. For purposes of describing the invention, the term "independent agent" is intended to refer to any heterogeneous vehicle such as, for example, VTOL autonomous aircraft 100 that cooperates with one or more other independent agents to undertake tasks, objectives, and/or navigate within a mission space in support of a mission.

Figure 2:
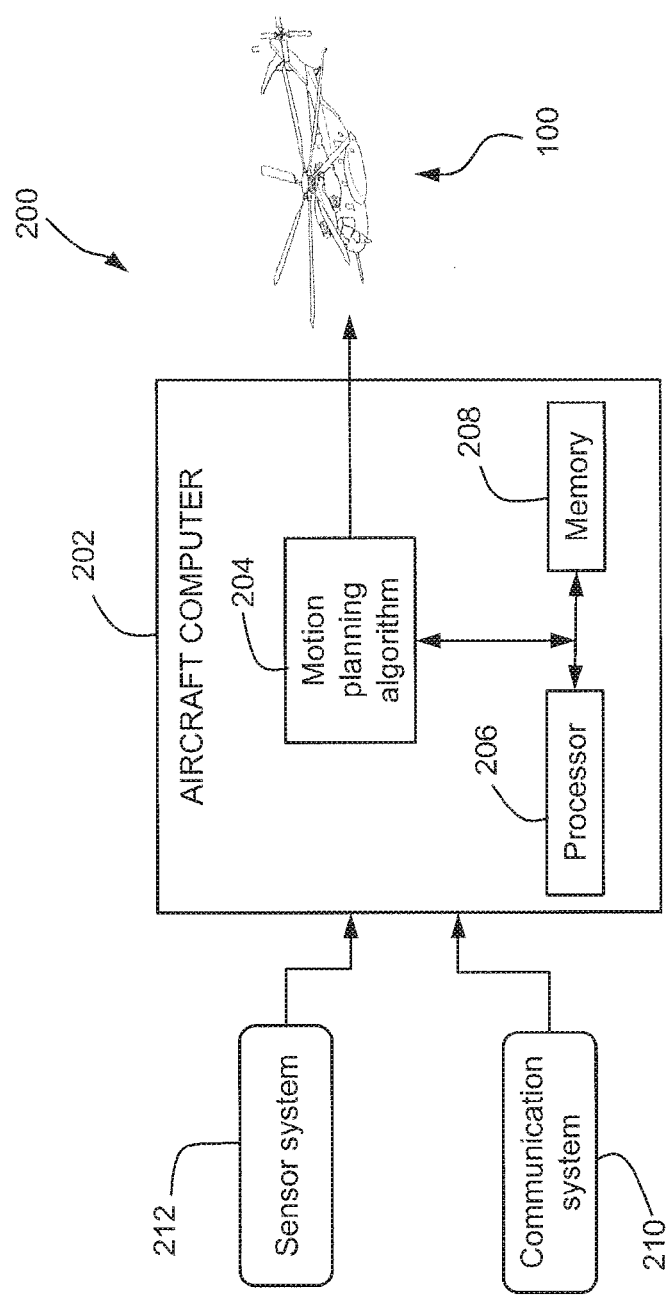
FIG. 2 is a schematic view of an example computing system according to an embodiment of the invention.

Rotary-wing aircraft 100 includes an airframe 102 having a main rotor assembly 104 and an extending tail 106 which mounts an anti-torque system, such as a tail rotor assembly 108. Main rotor assembly 104 includes a plurality of substantially similar rotor blades 112 while tail rotor assembly 108 includes a plurality of substantially similar blades 114. Also, aircraft 100 can include a sensor system 212 (FIG. 2). Sensor system 212 can include sensors associated with one or more devices for receiving state information or navigation data for aircraft 100. Although a particular vehicle in the form of a rotary-wing aircraft 100 is illustrated and described in the disclosed embodiments, it will be appreciated that other configurations and/or machines include autonomous and optionally piloted vehicles that may operate in land or water including fixed-wing aircraft, rotary-wing aircraft, marine vessels (e.g., submarines, ships, etc.), and land vehicles (e.g., trucks, cars, etc.) may also benefit from embodiments disclosed. As such, embodiments of the disclosed invention are not restricted to application in aircraft, but are applicable wherever coordinated motion planning between cooperative agents is desired.

FIG. 2 illustrates a schematic block diagram of a control system 200 for implementing coordinated motion planning in order to accomplish mission goals according to an exemplary embodiment. As illustrated, control system 200 implements a motion planning algorithm 204 for coordinated planning between cooperative agents, e.g., substantially similar to aircraft 100, in order to build a common operating picture though a communication network. Control system 200 includes a computing system such as an aircraft computer 202 having one or more processors and memory to process sensor data acquired from sensor system 212. Aircraft computer 202 can be provided on each cooperative agent. Aircraft computer 202 includes a memory 208. Memory 208 stores motion planning algorithm 204 as executable instructions that is executed by processor 206. The instructions may be stored or organized in any manner and at any level of abstraction, such as in connection with the execution of motion planning algorithm 204. Processor 206 may be any type of processor, central processing unit ("CPU") or graphics processing unit ("GPU"), including a general purpose processor, a digital signal processor, a microcontroller, an application specific integrated circuit ("ASIC"), a field programmable gate array ("FPGA"), or the like. In embodiments, memory 208 may include random access memory ("RAM"), read only memory ("ROM"), or other electronic, optical, magnetic or any other computer readable medium onto which is stored motion planning algorithm 204 described below with reference to FIGS. 3-4.

Sensor system 212 includes sensors associated with one or more data acquisition devices for sensing state information or position information for aircraft 100. In embodiments, sensor system 212 can include one or more navigation systems such as, for example, a Global Positioning System ("GPS"), an Inertial Measurement unit ("IMU"), or other inertial measurement system such as air data sensors or radio navigation systems that can be used to acquire positional data related to a current location and acceleration of aircraft 100 and can be used to determine a geographic location of aircraft 100 including a change from an initial position of aircraft 100, and sensors associated with a vision system such as cameras, LIght Detection and Ranging scanner (LIDAR), LAser Detection and Ranging scanner (LADAR). Communication system 210 can include radio communications such as air data scanner, instrument landing system (ILS), and radio navigation, or the like.

Figure 3:
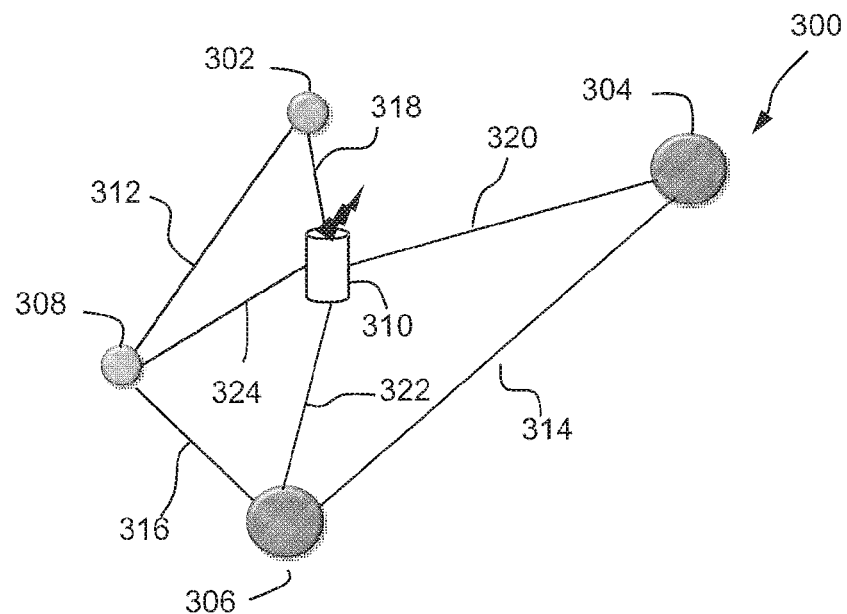
FIG. 3 is a schematic view of a network topology according to an embodiment of the invention.

FIG. 3 illustrates a schematic view depicting a network topology 300 for information sharing between agents over a communication network according to an embodiment of the invention. Network topology 300 includes agents 302-308 that communicate their respective local graphs over a communication network comprising communication links 312-316 in order to build a common or global graph for accomplishing mission goals. Each local graph comprises motion-based graph data objects having nodes and edges, as is described below. The network topology 300 may be dynamic, i.e., different connections may be made between agents 302-308 as objectives are accomplished by agents 302-308 or new obstacles require re-planning of the local- and global graphs.

As shown in FIG. 3, agents can have a direct communication link with other agents in the communication network through which local graph data from each independent is transmitted to agent. However, one or more agents may not have direct communication links with other agents such as, for example, agent 302 does not have a direct communication link with agent 304. In this case, communication of information may be facilitated through other agents that are connected in the communication network, for example, from agent 302 to agents 308, 306, and 304. In addition to the network connections depicted above, or alternatively, an optional communication beacon 310 (e.g., ground control station, airborne control station, airborne early warning control system, or the like) may facilitate network communication of information between agents 302-308 through communication links 318-324 in order to extend the range of communication network and/or facilitate communications between agents that are not directly connected through a communication link. In embodiments, each communication link 312-324 comprises communication system 210 (FIG. 2) that connects aircraft computer 202 (FIG. 2) by wire, cable, fiber optic, and/or wireless links facilitated by various types of well-known network elements, such as hubs, switches, and the like. Communication links 312-324 may employ various well-known protocols to transmit and receive information among independent agents 302-308 and/or communication beacon 310. For example, protocols can include wifi, wireless communications, e.g., long-term evolution ("LTE"), worldwide Interoperability for microwave access ("WiMAX"), general packet radio service ("GPRS"), or the like.

Figure 4:
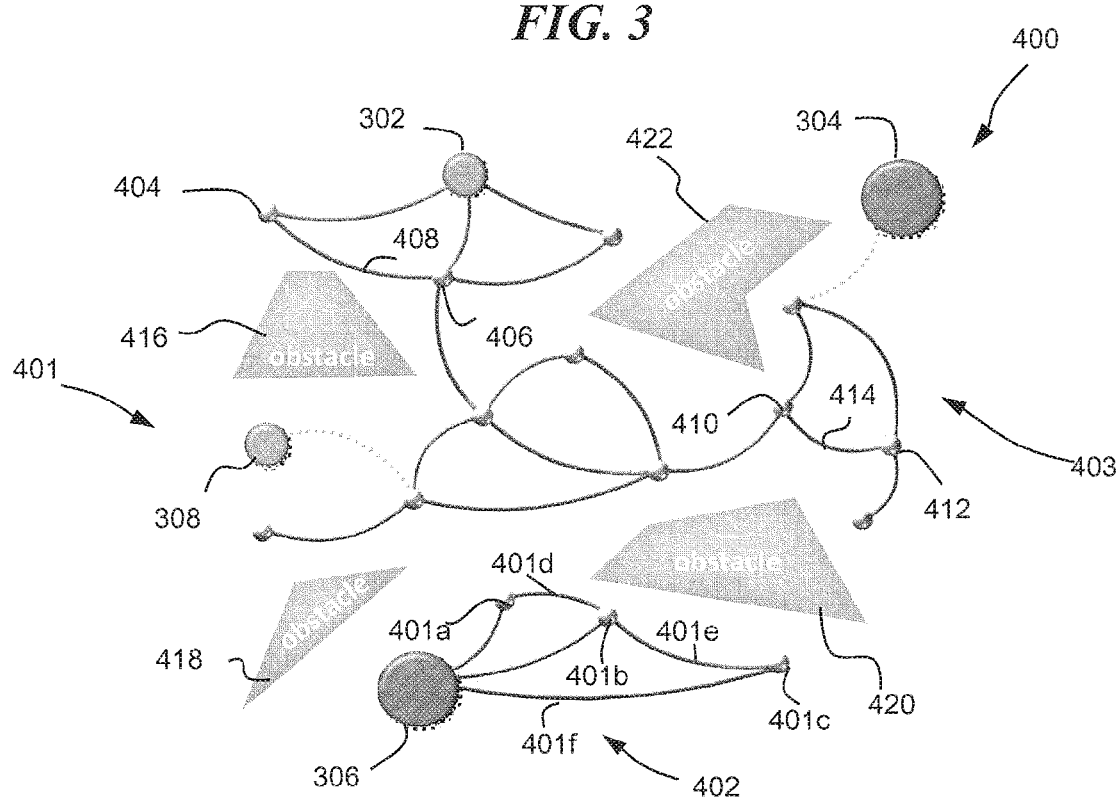
FIG. 4 is a schematic view of a graph topology according to an embodiment of the invention.

FIG. 4 illustrates a schematic view of a graph topology 400 for information sharing between agents based on a sampling-based planning method in a mission space that is performed by motion planning algorithm 204 (FIG. 2) according to an embodiment of the invention. Graph topology 400 depicts coordinated mission planning with local graph sharing between agents 302-308 in order to share a common operating picture of a mission space. The common operating picture is provided through a global graph where multiple agents coordinate to accomplish a set of tasks in the mission space.

As shown in FIG. 4, global graph 401 includes nodes and edges that are created from local graphs of agents 302-308. The global graph 401 can be assembled from local graphs of each agent 302-308 as they are received. In one example, agent 306 creates a local graph 401 that includes nodes 401a-401c and edges 401d-401f. Local graph 402 is shown decoupled from the global graph 401. Also, agent 304 is shown adding itself to respective local graphs received from agents 302, 304 to assemble global graph 401; agent 302 has created graph 403 from respective local graphs received from agents 304, 308; and agent 304 is shown adding itself to respective local graphs received from agents 302, 308. The global graph 401 is created with new information from the local graphs received by each agents 302-308 in order to create a common reachable roadmap of a mission space taking into account sensed obstacles 416-422, global mission planning data such as constraints, or the like for each independent agent 302-308. The global graph 401 designates the connectivity of a mission space for each agent 302-308 and the locations it can reach without conflicting with plans or objectives of other agents.

Each agent 302-308 has a sensor system 212 (FIG. 2) that can perceive local threats or obstacles within its environment. In addition, each agent 302-308 can store information related to mission planning constraints such as, e.g., no-fly zone areas, obstacles, or threats in a mission space, in order to construct a local graph based on threats and constraints in the environment. Each agent 302-308 creates a local graph including graph data objects comprising nodes and edges. The sampling-based planning method includes each agent 302-308 generating a local graph. Each agent 302-308 creates a local graph by placing various nodes throughout a roadmap in a mission space and joins these nodes using edges (i.e., path segments) to create a local graph. In the example shown in FIG. 4, nodes 404 and 406 are connected by edge 408 and nodes 410 and 412 are connected by edge 414. Each agent updates its local graph by assembling it with the local graphs received from other agents 302-306 in order to build a copy of a global graph at a "swarm" level. Agents 302-308, representing a swarm of agents, exchange information representing their respective local graphs having graph data objects over a communication network (FIG. 3) that connects the agents 302-308. The method of sharing local graphs and assembling these into a global graph is repeated as required for completing the underlying mission. Each agent 302-308, through the global graph 401, can determine the activities of other agents and can plan accordingly by avoiding the other agents, for example, in multi-vehicle collision avoidance applications, in convoy-type applications, or in rendezvous applications.

In multi-vehicle type applications, different vehicles share a common graph to deconflict motion plans. As a global graph, for example, global graph 401, provides a way to construct a common picture of reachability for each vehicles gent, it can provide means to compute rapid alternatives when plans conflict.

In rendezvous applications, two or more vehicles can plan to meet at a particular location. A tree-like graph object, which is a specific instance of a graph based data object, can be used where two vehicles build their local tree refinements and build consensus over the communication network by updating each other's tree information. For example, in a medical evacuation mission—where a soldier or an unmanned ground vehicle ("UGV") on the ground is meeting up with a helicopter to evacuate a casualty. The soldier or UGV's possible locations of reachability could be computed concurrently and shared with the helicopter and vice-versa. When a consensus is reached—the helicopter is able to reach a position that is also reachable by the UGV or the soldier.

In convoy-type applications where a convoy of autonomous vehicles is travelling to a common destination or a set of close destinations, the leading autonomous vehicle can provide the reachability information to trailing vehicle through its graph, and therefore, conduct mission plans in a convoy more effectively.

Benefits of the embodiments of the invention discussed herein provide for collaboration of plans between independent agents through a path planning method so that mission success and feasibility can be improved. The path planning method allows each agent to search the same graph for alternatives in order to avoid conflicts and complete objectives in a mission space.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiments of the invention have been described in relation to an autonomous aircraft, it is to be understood that aspects of the invention may include only some of the described embodiments. Accordingly, the invention is not to be seen as limited by the foregoing description, but is only limited by the scope of the appended claims.

What is claimed is:

1. A method for path planning for a plurality of vehicles in a mission space, comprising:

determining, with a processor on board a first vehicle, information indicative of a first local graph of the first vehicle, the first local graph including mission planning constraints of a mission space of the first vehicle;

receiving, with the processor over a communication link, information indicative of a second local graph from a second vehicle, the second local graph including mission planning constraints of a mission space of the second vehicle;

assembling, with the processor, information indicative of a global graph in response to the receiving of the second local graph; and coordinating operation of the first vehicle and the second vehicle to perform a set of tasks;

wherein the global graph includes information assembled from the first local graph and the second local graph; and wherein the global graph indicates connectivity of objectives for each vehicle of the plurality of vehicles in the mission space.

2. The method of claim 1, wherein the determining of the information of the first local graph comprises receiving sensor information indicative of obstacles and constraints in the mission space.

3. The method of claim 1, further comprising determining nodes and edges for each of the first and second local graph.

4. The method of claim 1, further comprising receiving the first local graph by the second vehicle and assembling the global graph in the second vehicle in response to the receiving of the first local graph.

5. The method of claim 4, further comprising receiving the first and second local graphs through direct communication links between the first and second vehicle over a communication network.

6. The method of claim 4, further comprising receiving the first and second local graphs through an indirect communication link connected to a communication beacon over a communication network.

7. The method of claim 1, further comprising re-planning the global graph as re-planned first and second local graphs are received by the first and second vehicles.

8. The method of claim 1, further comprising establishing direct communication links between the first vehicle and other vehicles as objectives in the global graph are accomplished.

9. A system for path planning for a plurality of vehicles in a mission space, comprising a communication network;

a processor on board a first vehicle; and memory having instructions stored thereon that, when executed by the processor, cause the system to:

determine information indicative of a first local graph of the first vehicle, the first local graph including mission planning constraints of a mission space of the first vehicle;

receive information indicative of a second local graph from a second vehicle, the second local graph including mission planning constraints of a mission space of the second vehicle;

assemble information indicative of a global graph for the mission space in response to the receiving of the second local graph; and coordinating operation of the first vehicle and the second vehicle to perform a set of tasks;

wherein the global graph includes information from the first local graph and the second local graph; and wherein the global graph indicates connectivity of objectives for each vehicle of the plurality of vehicles in the mission space.

10. The system of claim 9, wherein the processor is configured to receive sensor information indicative of obstacles and constraints in the mission space.

11. The system of claim 9, wherein the processor is configured to determine nodes and edges for each of the first and second local graph.

12. The system of claim 9, wherein the processor is configured to receive the first local graph by the second vehicle and assemble the global graph in the second vehicle in response to the receiving of the first local graph.

13. The system of claim 12, wherein the processor is configured to receive the first and second local graphs through direct communication links between the first and second vehicle over the communication network.

14. The system of claim 12, wherein the processor is configured to receive the first and second local graphs through an indirect communication link connected to a communication beacon over the communication network.

15. The system of claim 9, wherein the processor is configured to re-planning the global graph as re-planned first and second local graphs are received by the first and second vehicles.

* * * * *